June 7, 1960  A. R. MULLIN  2,939,636
SPRAYING ATTACHMENT FOR ROTARY LAWNMOWER
Filed Dec. 31, 1956

INVENTOR.
Archie R. Mullin
BY
ATTORNEY.

United States Patent Office 2,939,636
Patented June 7, 1960

2,939,636

SPRAYING ATTACHMENT FOR ROTARY LAWNMOWER

Archie R. Mullin, 522 Osage, Neodesha, Kans.

Filed Dec. 31, 1956, Ser. No. 631,819

5 Claims. (Cl. 239—223)

This invention relates to the field of spraying apparatus for use in spraying liquid weed killer, insecticide, fertilizer or the like upon a lawn or garden area. More particularly, the invention contemplates an improved spray forming and dispensing attachment especially adapted for use in conjunction with structure of a conventional, power type, rotary lawn mower.

The invention further relates to an improvement upon the structure disclosed in my copending application for United States Letters Patent Serial No. 603,094, entitled "Rotary Lawn Mower Spraying Attachment," filed August 9, 1956, of which this is a continuation-in-part.

It is the primary object of this invention to provide improved spraying means adapted for converting a liquid material into a fine spray or mist and for forcibly directing such spray downwardly against a well defined area of ground being traversed with the spray being applied to the ground in substantially uniform quantity throughout such area.

It is another important object of this invention to provide a spraying attachment adapted for use upon a conventional, rotary-type lawn mower either when the blade of the latter is left on for simultaneous operation of the mower blade and the spraying attachment, or when the mowing blade has been removed for operation of the spraying attachment alone by the power means forming a part of the lawn mower assembly.

It is another important object of this invention to provide such a spraying attachment which may be easily emplaced upon and removed from the vertical power shaft normally provided in conventional, rotary lawn mowers.

It is another important object of the invention to provide such a spray attachment which includes baffle means disposed in the path of travel of a stream of liquid material for breaking the same into a spray by impact and further baffle means for creating a downwardly directed, artificial current of air for forcibly carrying the spray against the ground.

Still other important objects of the invention, including certain significant details of construction, will be made clear or become apparent as the following description of the invention progresses.

Although the attachment of my mentioned copending application operates satisfactorily for many purposes, it has been found that the improved structure provided by the present invention possesses advantages thereover, particularly with respect to the definition of the margins of the area being sprayed and the uniformity with which the spray is distributed throughout the area being treated.

Figure 1:
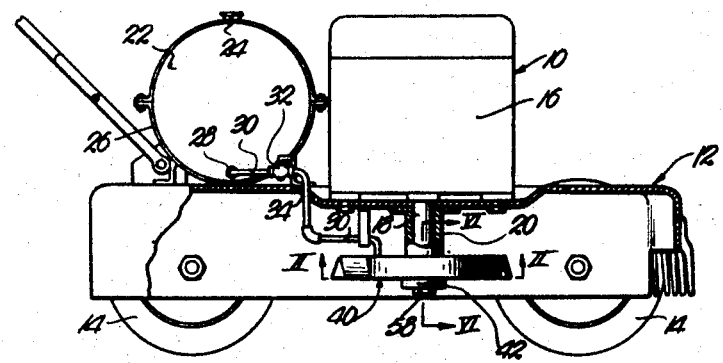
Figure 1 is a fragmentary, side elevational view of one form of conventional, rotary, power lawn mower showing the apparatus particularly contemplated by this invention in operative disposition thereon, a part of the mower carriage being broken away and shown in cross section for clarity of illustration.
Figures 2, 5:
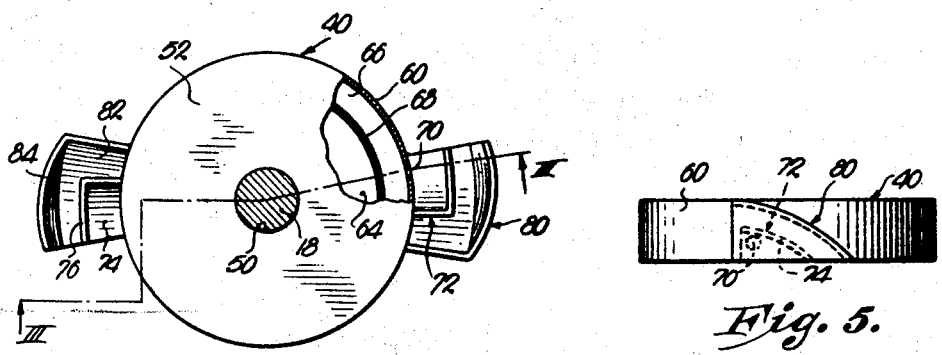
Fig. 2 is an enlarged cross-sectional view taken on line II—II of Fig. 1 illustrating the improved attachment in bottom plan, with parts being broken away.
Fig. 5 is a side elevational view of the attachment per se taken from the direction of one of the sets of baffle means thereon.

Referring to the accompanying drawing, Figure 1 shows one form of conventional, power-operated, rotary lawn mower generally designated 10, having a mobile carriage 12 provided with a number of wheels 14, there being a prime mover 16 mounted on the carriage 12 and having a rotatable, vertical power shaft 18 extending through a bearing sleeve 20 secured to the underside of the carriage 12. As shown for illustrative purposes only, the prime mover 16 may comprise an electric motor, although it will be understood that the invention is equally applicable to a power mower 10 in which the motive power for a rotatable vertical shaft 18 is provided by an internal combustion engine having fuel storage means (not shown) mounted upon the carriage 12.

This invention contemplates the provision of apparatus for use in conjunction with such a mower 10 including a storage tank 22 for receiving liquid material to be dispensed through an inlet 24, which tank 22 may be held upon the carriage 12 by any suitable means such as clamps 26. The tank 22 is provided with an outlet port 28 to which is connected an outlet pipe 30 having a manual flow regulation valve 32 interposed therein. Liquid outlet pipe 30 extends through an opening 34 in the top of carriage 12 and terminates as at 36 (see Fig. 3) in an open, downwardly directed spout adapted for discharging liquid from the tank 22 into the spraying attachment generally designated by the numeral 40.

Figures 3, 6:
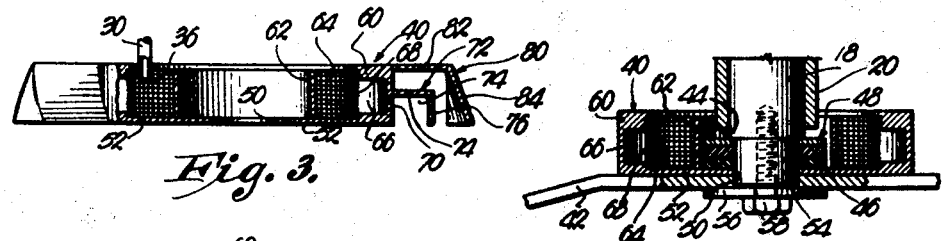
Fig. 3 is a cross-sectional view taken on irregular line III—III of Fig. 2.
Fig. 6 is an enlarged fragmentary, cross-sectional view taken on line VI—VI of Fig. 1.
Figure 4:
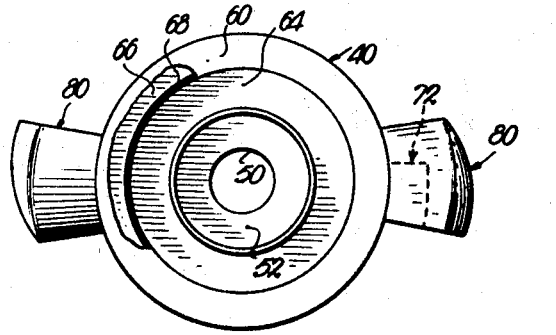
Fig. 4 is a top plan view of the attachment per se.

As illustrated in Figs. 1 and 6, the attachment 40 may be installed upon the lower end of the power shaft 18 for rotation therewith with the rotary mower blade 42 conventionally forming a part of the mower 10 also mounted on the shaft 18 for rotation therewith below the attachment 40. Alternatively, where it is desired to spray only without mowing, it will be apparent that the blade 42 may be removed from the shaft 18 and replaced, if necessary for the purpose of holding the attachment 40 securely upon the shaft 18, with a suitable washer (not shown). Although the mounting means provided on the power shafts 18 of mowers 10 of different manufacture vary somewhat, it will be understood that any suitable, frictional holding means may be employed. For purposes of illustration, Fig. 6 shows one common type of mower power shaft 18 having a downwardly directed shoulder 44 and a lowermost shaft stretch 46 of lesser diameter than the portion of shaft 18 above the shoulder 44.

A number of space-occupying and friction washers generally indicated in Fig. 6 at 48, may be provided upon the stretch 46 of shaft 18, the stretch 46 then passed through a hole 50 in the bottom wall 52 of attachment 40, the stretch 46 then passed through the mounting hole 54 conventionally provided in the mower blade 42, and the whole assembly may then be secured by means of a frictional washer 56 below the blade 42 held in place upon the shaft 18 by a bolt or the like 58 threaded into the latter. From Fig. 6, the manner in which the attachment 40 may be installed upon the shaft 18 with a suitable washer being substituted for the blade 42 will be apparent.

The attachment 40 is preferably constructed to include, besides the annular bottom wall 52, an upstanding circumferential side portion 60 and an annular, upstanding flange 62 spaced inwardly from the side portion 60 intermediate the latter and the opening 50. The space within the flange 62 is, as will be most clear in Fig. 6, adapted to receive the washers 48 and shaft 18, together with such other structure as may be provided for mounting the attachment 40 upon the shaft 18. Flange 62 also defines, however, the inner boundary of an open top compartment 64 closed at its bottom by the bottom wall 52 and at its outer extremity by the side portion 60 of attachment 40. As will be clear from Fig. 3, the spout portion 36 of liquid delivery pipe 30 extends into the compartment 64 from the open top thereof, the relationship being such that no physical interference will occur between the attachment 40 and the spout portion 36 during rotation of the attachment 40.

An outwardly extending, annular concavity 66 opening about its entire inner circumference upon the compartment 64, is provided within the side portion 60 of attachment 40. A foraminous annular screen 68 is disposed within the compartment 64 adjacent the side portion 60 for separating the compartment 64 into an inner chamber between the screen 68 and flange 62 and an outer chamber enclosed by the side portion 60 and the screen 68. Such screen 68 serves to filter out solid particles discharged from the spout 36 into the inner chamber portion of compartment 64 during flow by centrifugal force of such liquid material through the screen 68 into the outer chamber or concavity 66 when the attachment 40 is being rotated.

In the preferred embodiment, the side portion 60 is provided with a pair of opposed outlet ports 70 communicating with the outer chamber portion 66 of compartment 64. During rotation of the attachment 40 liquid within the compartment 64, and particularly the outer chamber portion 66 thereof, will flow by centrifugal force in a stream outwardly through the outlet ports 70.

There is provided on the attachment 40 adjacent each outlet port 70 an inner baffle structure generally designated 72 having an outwardly, downwardly and rearwardly extending portion 74 above the outlet 70, and a vertical portion 76 extending downwardly from the portion 74 to a level below the port 70, it being noted that the term "rearwardly" is used with relation to the direction of normal rotation of the attachment 40 when the prime mover 16 is operated.

The stream of liquid emanating from each port 70 impinges, at least in large part, upon the portion 76 of the corresponding inner baffle means 72, which tends to effect a partial break-down of the liquid into separated particles. As the attachment 40 rotates, the downwardly sloping portion 74 of the inner baffle means 72 then strikes the liquid particles formed by portion 76 and any portion of the liquid stream that may remain unbroken to accomplish a further break-down of the liquid material into a fine mist or spray. By virtue of the downward slope of portion 74 of baffle means 72, the spray is directed downwardly as it emerges from the baffle means 72.

Adjacent each inner baffle means 72, there is further provided on the attachment 40 an outer baffle means generally designated 80 having an outwardly, downwardly and rearwardly sloping portion 82 and a downwardly extending portion 84. The portion 82 of outer baffle means 80 extends from a position slightly forwardly of the front extremity of portion 74 of inner baffle means 72 and thereabove to a position rearwardly of the rearmost extremity of the portion 74 of inner baffle means 72. The portion 84 of outer baffle means 80 is integral with the portion 82 thereof and extends downwardly therefrom in spaced relationship to the portion 76 of inner baffle means 72 to a level substantially even with the lower extremity of the latter and the bottom wall 52 of attachment 40.

The outer baffle means 80 acts as an air scoop during rotation of the attachment 40 to create a relatively strong, downwardly directed, artificial current of air which emanates from the outer baffle means 80 directly to the rear of the inner baffle means 72. Accordingly, liquid spray being discharged in a generally downward and rearward direction by the inner baffle means 72, is picked up by the strong, downwardly directed, artificial air current created by the outer baffle means 80 and forcibly carried downwardly to the ground to which such spray is to be applied.

The formation of the outer baffle means 80 is such that the current of air created thereby accomplishes a substantially uniform distribution of the spray discharged from inner baffle means 72 upon the width of the strip of ground being traversed by the mobile carriage 12, it being noted in this respect that the upper portion 82 of outer baffle means 80 is somewhat broader at its forward extremity than at its rearward extremity, and that the portion 84 of outer baffle means 80 accordingly slopes somewhat outwardly and downwardly at its front extremity while being substantially vertical adjacent its rear extremity.

It will thus be apparent that the improved apparatus contemplated by the present invention is ideally adapted for accomplishing all of the above-mentioned and other objects. It will be equally manifest, however, that certain minor modification and changes could be made from the exact details of construction of the preferred embodiment above described for purposes of illustration without departing from the true spirit or intention of the invention. It should be understood therefore, that the invention shall be deemed limited only by the scope of the claims that follow.

Having thus described the invention, what is claimed as new and desired to be secured by Letters Patent is:

1. A rotary, liquid spraying attachment comprising a body adapted to be mounted on a rotatable, vertical shaft for rotation with the latter and provided with a liquid receiving, internal compartment having an outwardly facing, outlet port through which liquid from the compartment is dischargeable by centrifugal force; and baffle means on the body adjacent the port, said baffle means including an inwardly facing portion spaced outwardly of the port and disposed in the path of travel of at least a part of the liquid being discharged from the port during rotation of the body for changing said part of the liquid into a spray and a downwardly facing, rearwardly extending portion integral with said inwardly facing portion and disposed generally tangentially of the direction of rotation of the attachment and in the path of travel of at least a part of the liquid being discharged from the port for changing the same into a spray and impelling the same downwardly.

2. In an attachment as set forth in claim 1, wherein said body is provided with an annular, upwardly facing opening in communication with the compartment for continuous admission of liquid to the compartment during rotation of the body from stationary liquid discharging means extending from above the body, through the opening and into the compartment.

3. A rotary, liquid spraying attachment comprising a body adapted to be mounted on a rotatable, vertical shaft for rotation with the latter and provided with a liquid receiving, internal compartment having an outwardly facing, outlet port through which liquid from the compartment is dischargeable by centrifugal force; inner baffle means on the body for rotation therewith and disposed in the path of travel of at least a part of the liquid discharged from the port during rotation of the body for changing said part of the liquid into a spray upon impact therewith; and outer baffle means on the body for rotation therewith and disposed adjacent the inner baffle means and facing downwardly and generally tangentially of the direction of rotation of the body for creating a downwardly directed, artificial current of air to forcibly carry the spray downwardly.

4. In apparatus as set forth in claim 3, wherein said inner baffle means includes an inwardly facing portion spaced outwardly of the port and disposed in the path of travel of at least a part of the liquid being discharged from the port for changing said part of the liquid into a spray, and a portion integral with said inwardly facing portion, disposed between the latter and the body and facing downwardly and generally tangentially of the direction of rotation of the body and disposed in the path of travel of at least a part of the liquid being discharged from the port for changing the same into a spray and impelling the same downwardly.

5. In apparatus as set forth in claim 4, wherein said compartment is divided into an inner and an outer chamber, said chambers being in communication with each other for flow by centrifugal force of liquid received by the inner chamber into the outer chamber, the port being in communication with the outer chamber, there being a foraminous filtering screen between the inner and the outer chambers.

References Cited in the file of this patent

UNITED STATES PATENTS

| | | |
|---|---|---|
| 428,113 | Layman | May 20, 1890 |
| 990,335 | Cantwell | Apr. 25, 1911 |
| 1,751,531 | Schars | Mar. 25, 1930 |
| 1,869,296 | Beiler | July 26, 1932 |
| 2,573,784 | Asbury | Nov. 6, 1951 |
| 2,742,751 | Laughlin | Apr. 24, 1956 |
| 2,778,680 | Bonser | Jan. 22, 1957 |
| 2,784,033 | Amberg | Mar. 5, 1957 |

FOREIGN PATENTS

| | | |
|---|---|---|
| 662,303 | France | Mar. 18, 1929 |
| 1,067,049 | France | Jan. 27, 1954 |